(12) United States Patent
Wingerter et al.

(10) Patent No.: US 11,668,350 B2
(45) Date of Patent: Jun. 6, 2023

(54) UNIVERSAL JOINT

(71) Applicant: Alliance OFS Solutions LLC, Conroe, TX (US)

(72) Inventors: Rodney M. Wingerter, Conroe, TX (US); Jawad A. Alsadah, Conroe, TX (US)

(73) Assignee: Quantum Energy Technologies LLC, Conroe, TX (US)

(*) Notice: Subject to any disclaimer, the term of this patent is extended or adjusted under 35 U.S.C. 154(b) by 222 days.

(21) Appl. No.: 17/063,692

(22) Filed: Oct. 5, 2020

(65) Prior Publication Data

US 2021/0131502 A1    May 6, 2021

Related U.S. Application Data

(60) Provisional application No. 62/928,641, filed on Oct. 31, 2019.

(51) Int. Cl.
  *F16D 3/24* (2006.01)
  *F16D 3/72* (2006.01)

(52) U.S. Cl.
  CPC ............. *F16D 3/24* (2013.01); *F16D 3/72* (2013.01); *F16D 2200/0021* (2013.01); *F16D 2300/06* (2013.01)

(58) Field of Classification Search
  CPC ...... F16D 3/24; F16D 3/72; F16D 2200/0021; F16D 2300/06
  USPC .......................................... 464/139, 141, 152
  See application file for complete search history.

(56) References Cited

U.S. PATENT DOCUMENTS

| | | | | |
|---|---|---|---|---|
| 1,300,541 A | * | 4/1919 | Wolffgram | F16D 3/221 |
| | | | | 464/152 |
| 2,156,106 A | * | 4/1939 | Bill | F16D 3/24 |
| | | | | 464/142 |
| 2,473,036 A | * | 6/1949 | Miller, Jr. | F16D 3/24 |
| | | | | 464/142 |
| 2,862,373 A | * | 12/1958 | Gibson | F16D 3/24 |

\* cited by examiner

*Primary Examiner* — Greg Binda
(74) *Attorney, Agent, or Firm* — Dossey & Jones PLLC; Phillip Black (57) ABSTRACT

A universal joint, having a first joint member with longitudinally extending arms, each arm having one or more contact surfaces and a second joint member with longitudinally extending arms, where each arm includes one or more contact surfaces. The universal joint also includes one or more independent contact objects disposed between a contact surface of the first joint member and a contact surface of the second joint member. The universal joint also includes a load rod disposed in an axial channel between the first joint member and the second joint member.

5 Claims, 8 Drawing Sheets

FIG. 11

UNIVERSAL JOINT

FIELD OF INVENTION

The present invention is directed to a universal joint. Though its use spans several industries, this universal joint described herein refers to its use in downhole drilling strings.

GENERAL BACKGROUND

In common drilling operations, a drill string is maneuvered downhole to deepen a borehole for the purpose of reaching a desired production zone. The drill string generally includes a drill bit, a motor, and a string of drill pipe, or connected joints, directed downhole from the surface during the drilling process. The drill string can be rotated from the top of the string by a motor and/or the drill bit can be rotated by the motor at or near the bottom of the drill string. The drilling motors, more specifically the common "mud motor," tend to provide an output rotation that is eccentric, which causes inaccurate and inefficient drilling.

Generally, a major problem with existing universal joints when used as a driveshaft/transmission in a mud motor is that it is made loosely so it can rotate without interfering with itself. This allows the universal joints to move axially, pulling the drive train apart for a limited distance. This in turn causes the rotor in the power section of the motor to bounce up and down, thereby creating an impact on the joint members. At the same time, the universal joint is spinning at high rotations per minute (or "RPM's") with metal to metal or rubber to metal surfaces. Damage to these can be severe and costly. Wear and tear on the drill string caused by the eccentric rotation of the motor requires frequent replacement of parts, resulting in down-time of the drilling operation. Eccentric rotation of the motor(s) should be converted into concentric rotation so that drilling continues with efficiency. It has become common practice to include one or more universal joints below the power section to reduce the eccentricities when transferring torque to the drill bit. However, the commonly used universal joint is limited in its performance and still sustains significant wear and must be replaced often. Therefore, a need exists for a more sustainable universal joint that further reduces and/or eliminates eccentricities during operation.

SUMMARY

The present invention provides a universal joint and/or universal joint assembly that increases the efficiency of a downhole drill string.

The universal joint disclosed herein is used to take the eccentricity out of the power section of a downhole drilling motor. The design of this universal joint consists of two joint members. Each joint member has multiple arms that overlap or engage one another about the center section. A load rod can connect the members to the center with through set rods that can be held in place with sets screws. This configuration placing the load weight on the load rod and restricts how much the joint members can be pulled apart from one another, thereby restricting how much the rotor can bounce. A tapered bore on the center section allows the eccentric rotation of the power section to the lower concentric member attached to the bearing assembly. The joint members can also house contact objects between corresponding contact surfaces to bear the load of axial rotation and reduced wear on universal joint components. By using the contact objects to bear the torque load and the load rod to bear the directional force, the cost of rebuilding the universal joint and operation downtime at the well are both greatly reduced. The universal joint can also be sealed with a rubber sleeve and lubricated with a heavy viscosity grease.

Additional aspects of the universal joint disclosed herein can include methods of making and using the same in accordance with the foregoing aspects. It should also be noted that the universal joint further encompasses the various possible combinations of the aspects and features disclosed herein.

BRIEF DESCRIPTION OF THE DRAWING(S)

The accompanying drawings illustrate various exemplary implementations and are part of the specification. The illustrated implementations are proffered for purpose of example, not for purpose of limitation.

DETAILED DESCRIPTION

The universal joint disclosed herein can include first and second joint members, each having a unique central axis, that engage one another to transfer torque from one to the other. One or more arms extend longitudinally from the body of each joint member and are arranged such that the arms from the first joint member mortised with, or engage, the arms of the second joint member. Each arm includes one or more contact surfaces and one or more of those contact surfaces can include one or more seats to house a contact object. The contact object can bear the rotational forces, torque, imposed on the universal joint during operation. The arms can also form a central cavity and a load rod can be disposed therein such that it bears the longitudinal forces imposed on the universal joint during operation.

Figure 3:
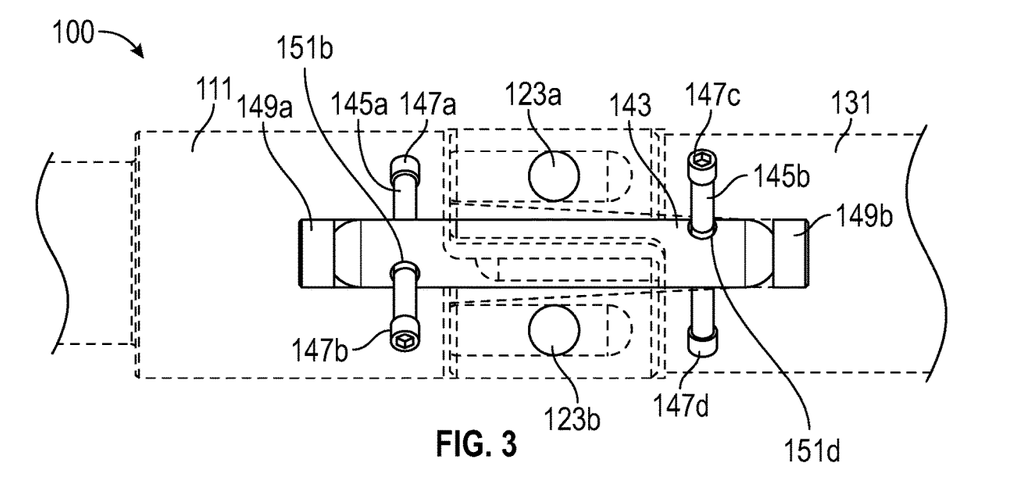
FIG. 3 depicts an x-ray view of the universal joint assembly, as shown and described herein.
Figure 4:
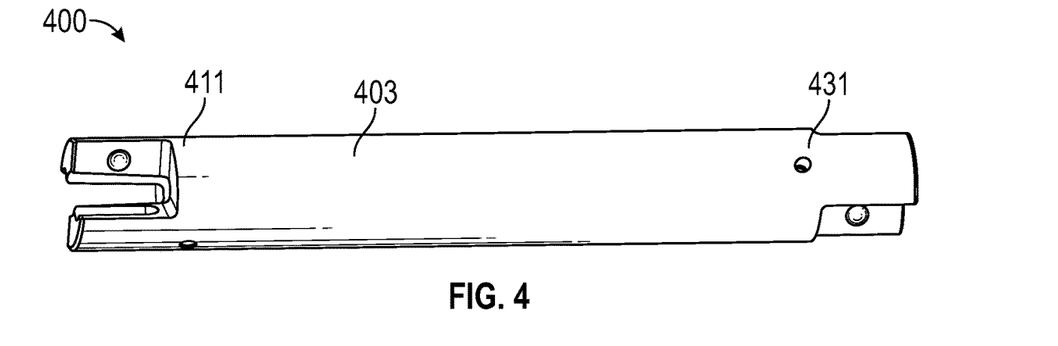
FIG. 4 depicts a torque transfer member, as shown and described herein.
Figure 5:
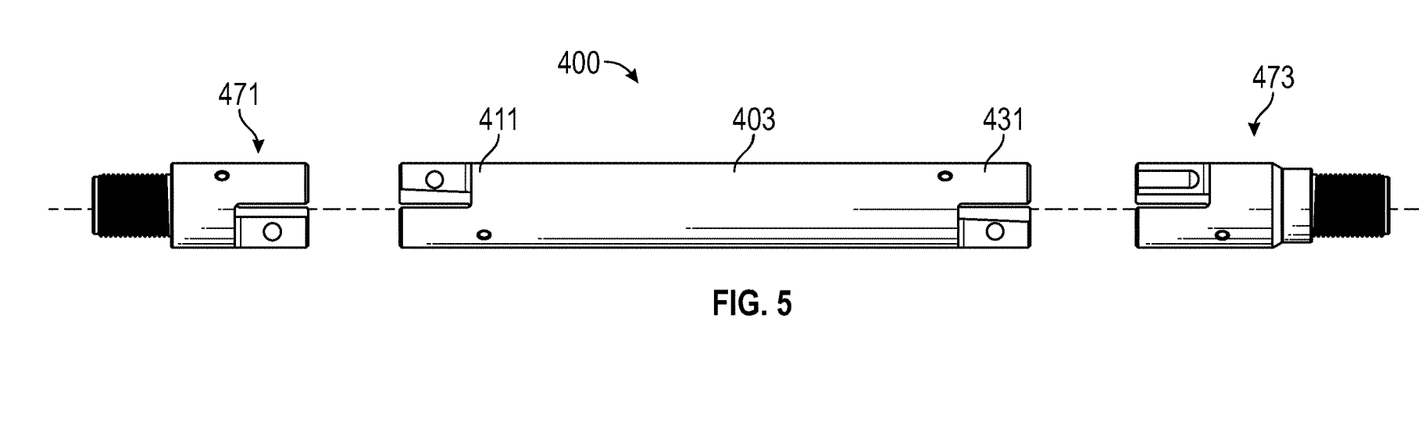
FIG. 5 depicts a torque transfer system, as shown and described herein.

FIGS. 1 through 5 show a first embodiment of the universal joint 100 disclosed herein. As shown in the exploded view of FIG. 1, the first joint member 111 can include an elongated body about a unique central axis and can have one or more arms 113a, 113b (two are shown) extending longitudinally therefrom. The second joint member 131 can also include an elongated body about a unique central axis and can have one or more arms 133a, 133b (two are shown) extending longitudinally therefrom. The bodies of the first and second joint members from which the arms extend can be similar to each other or different from one another (as shown in FIG. 5).

Figure 1:
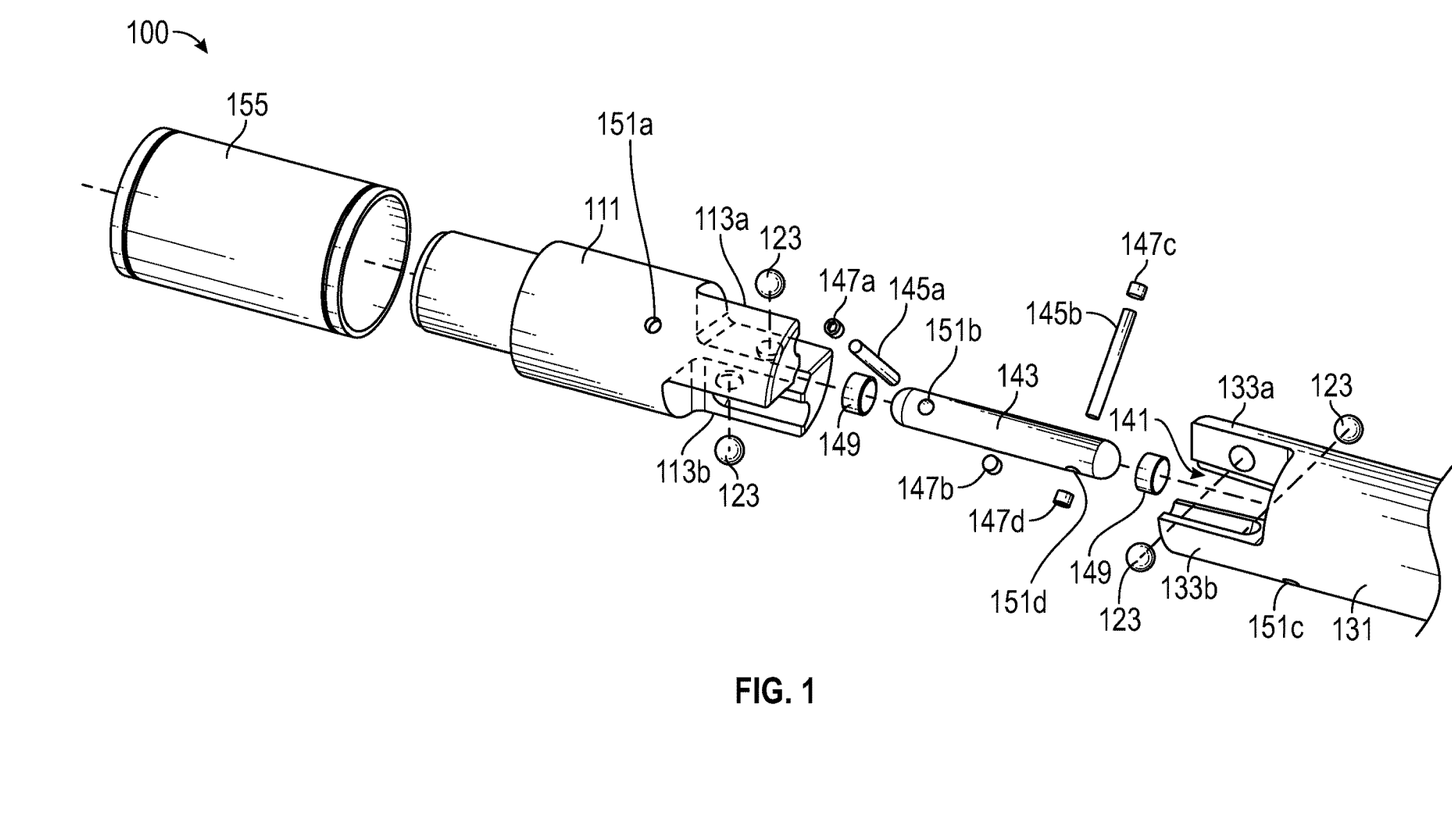
FIG. 1 depicts an exploded view of a first embodiment of a universal joint, as shown and described herein.

Each arm 113, 133 can include a contact surface and each contact surface can include an open ball seat, a closed ball seat, a combination thereof, or no seat at all. One or more of the arms 113, 133 can include a bore, or carve out, such that a central cavity 141 is formed when the universal joint 100 is assembled. A load rod 143 can be disposed in the central cavity 141 which can be secured into place by one or more set rods 145. The set rods 145 can be held in place by one or more set screws 147. The universal joint assembly can also include a joint sleeve 155 to incase the universal joint, or a portion thereof.

Figure 2A:
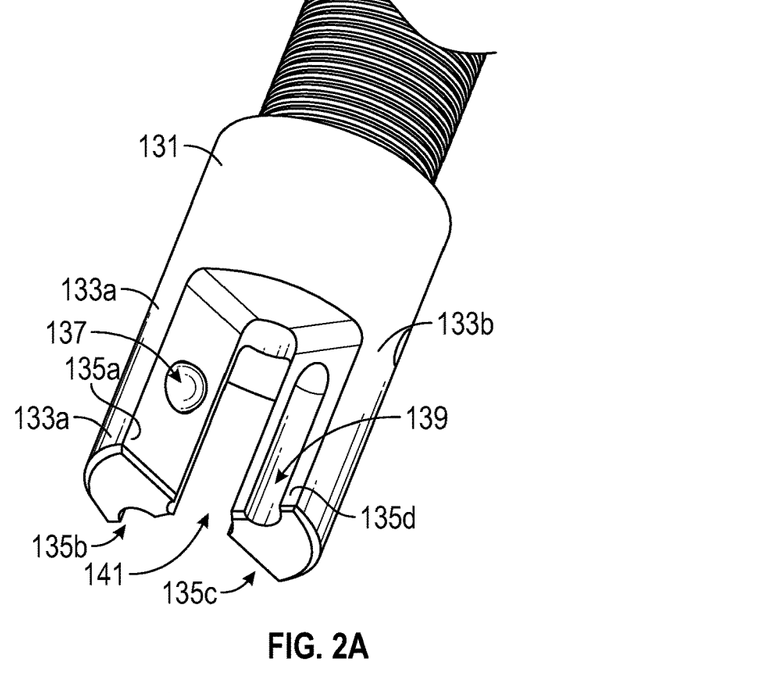
FIG. 2A depicts a first perspective view of the first joint member, as shown and described herein.
Figure 2B:
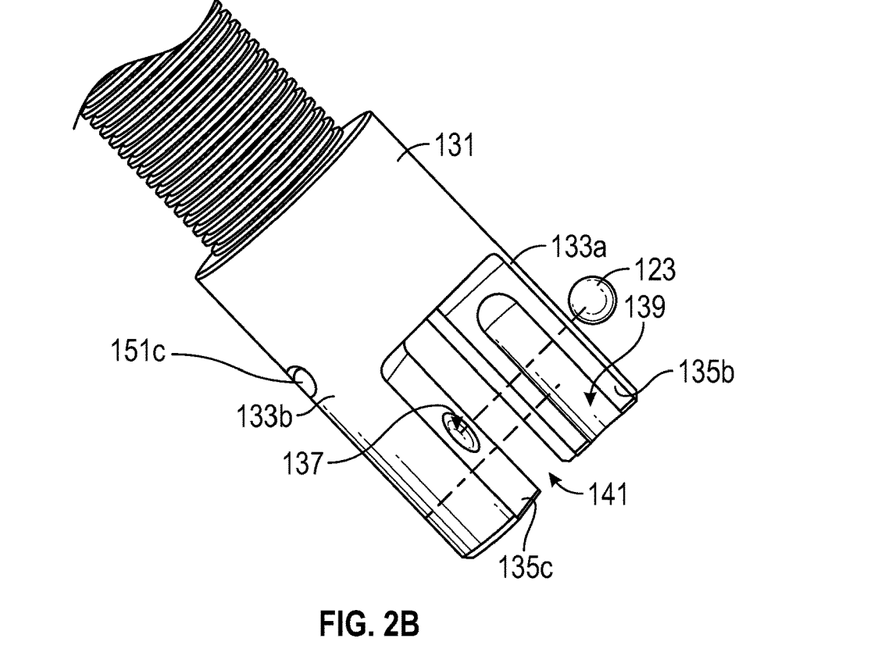
FIG. 2B depicts a second perspective view of the first joint member, as shown and described herein.

FIG. 2A depicts a close-up view of a first side of the second joint member 131 and FIG. 2B depicts a close-up view of a second side of the second joint member 131. Some or all of the components of the first joint member 111 correspond with or mirror the second joint member 131 such that its configuration can be understood as described and shown herein.

The second joint member 131 can include the first arm 133a and the second arm 133b. The first arm 133a can include a first contact surface 135a and a second contact surface 135b. The first contact surface 135a and/or the second contact surface 135b of the first arm 133a can include a closed seat 137 or an open seat 139. As shown, the first contact surface 135a includes a closed seat 137 and the second contact surface 135b includes an open seat 139.

Similarly, the second arm 133b can include a first contact surface 135c and a second contact surface 135d. The first contact surface 135c and/or the second contact surface 135d of the second arm 133b can include a closed seat 137 or an open seat 139. As shown, the first contact surface 135c includes a closed seat 137 and the second contact surface 135d includes an open seat 139.

In an alternative embodiment, a seat can be absent from one or more contact surfaces such that the contact surface is a flat surface. For example, a contact surface can be a flat surface having no inward cavity or outward appendages.

Referring generally to the figures, the first and second universal joint members transfer torque by contact of the arms. Generally, the contact surfaces of opposing joint members are intended to impose or receive the rotational force during operation. The extreme erosion of the arms about the contact surfaces can be reduced or minimized by localizing the contact force to the contact object disposed between the corresponding contact surfaces. A contact object can be disposed between each set of corresponding contact surfaces. The contact object(s) can include one or more solid objects capable of withstanding extreme forces such that the contact object(s) bear the majority, if not the entirety, of the contact forces as the universal joint rotates. The contact object can be made of a variety of materials but is most often made of a hard metal or metal alloy capable of withstanding the torque under conditions in which the universal joint is operating. For example, the contact object can be made of engineered steel, carbon steel, alloy steel, stainless steel, or tool steel. Such materials can include nickel, chromium, molybdenum, iron, titanium, or a combination thereof. The contact object can also be made of ceramic or carbide, highly durable polymers, including synthetic fibers, high impact polystyrene, and low-density polyethylene.

The contact object can be a variety of shapes and sizes. The size of the contact object is predetermined based generally on the size of the universal joint and, more specifically, on the size of the arms and/or contact surfaces the contact objects are fitted to. The shape of the contact object can be predetermined and based on a variety of factors. For example, the shape of the contact object can be determined based on the amount of wobble the universal joint is expected to endure. The shape can also be determined based on the amount or force it is expected to endure and/or the ability of the contact surface to retain the contact object during operation.

As depicted in FIGS. 1 through 5, the contact object 123 can include a contact ball, or sphere. The spherical shape of the contact ball provides several benefits. First, the spherical shape has been shown to generally resist wear better than other shapes, as force is distributed evenly to the entire object, alleviating any pressure points. The sphere also provides greater maneuverability of the joint members during operation, as the arms are not restricted to comply with the shape of the contact object as contact between corresponding contact surfaces takes place.

The contact object 123 is generally three dimensional and disposed within a carveout, or "seat," made in the contact surface(s). Each contact object 123 is positioned, or "seated," between corresponding contact surfaces. The contact object 123 is intended to minimize, or in some circumstances eliminate, direct contact actually made between corresponding contact surfaces. Instead, the contact forces am partially or completely directed from one contact surface through the contact object 123 to the other contact surface. In an alternative embodiment (not shown), only one of two opposing contact surfaces may include a seat for seating the contact object 123 and the other contact surface may include a flat surface.

The seats disposed in the contact surfaces can be sized and shaped to accommodate the contact object 123. As shown, seats disposed in corresponding contact surfaces can be different from one another while, at the same time, accommodating the contact object. Moreover, the seats can be configured or designed such that the contact object protrudes from the contact surface to the corresponding, or opposing, contact surface. As indicated by the figures, the contact object may be seated partially in a first seat and seated partially in a second seat.

As used herein, a "seat" can be defined as a divot, grove, or cut-out in a contact surface of a joint member. The seat can be generally cylindrical, circular, elongated, or otherwise shaped to accommodate a contact object. Accommodating a contact object can mean to secure or partially secure the contact object within a predetermined position on the contact surface. Accommodating a contact object can also be understood to mean maintaining the contact object between the contact surfaces such that the contact object does not escape from its intended position between the two contact surfaces. The seat disposed on a contact surface of a first joint member can be intended to oppose, or otherwise align with, all or a portion of the seat disposed on a contact surface of a second joint member. As such, a contact object can be disposed between the opposing contact surfaces within the opposing seats, having a portion of the contact object disposed in the first seat and a portion of the contact object disposed in the second seat. Accommodating or securing a contact object in one or more seats does not necessarily mean that the contact object is to remain stationary in relation to one or more of the contact surfaces. Allowing for mobility of the contact object may be preferential in certain circumstances.

As shown, the contact object 123 can be a ball. As the seats are intended to retain or restrict the ball, the seats may take a variety of shapes and configurations. A first embodiment of a seat can be a closed seat. A closed seat can be configured such that it restricts lateral movement in the object in relation to the plane of the contact surface. When the contact object 123 is a ball, the closed seat is generally spherical and made the proper size to prevent or restrict lateral movement of the ball. An open seat can allow for lateral movement of the contact object 123 while maintaining the contact object 123 between the contact surfaces.

FIG. 3 depicts an X-ray view of the assembled universal joint 100 of FIG. 1. When assembled, the arms 113a, 113b from the first joint member 111 and the arms 133a, 133b from the second joint member engage one another in an overlapping configuration. The load rod 143 is disposed in the central cavity 141 created about the central axes of the first and second joint members 111, 131. Each of the first and second joint members 111, 131 has its own axis, and in the event the universal joint 100 is perfectly aligned, the central axis of the first joint member 111 will align with the central axis of the second joint member 131. In most operational conditions, however, the axis of the first joint member may deviate from the central axis of the second joint member 131 by as much as 20 degrees, and in some cases more than 20 degrees. As such, the central cavity 141 can be shaped and sized wider than the outer diameter of the load rod 143 to provide space necessary to accommodate the eccentric movement of the joint members 111, 131 spinning about their own central axis while maintaining the position of the load rod 143 within the central cavity 141. In one or more embodiments, the central cavity 141 can be a tapered bore section formed by the arms. That is, the arms of each joint member can form a tapered bore so that, when the arms overlap, the arms are able to axially rotate while allowing for the eccentricities caused by the power section. The tapered bore configuration can alleviate the system of the eccentricities during operation, creating smooth, concentric rotation of the motor.

One or both of the terminal ends of the load rod 143 can abut or otherwise rest in a load bed 149. The load bed 149 can be positioned within the central cavity of each joint member in a position between the arms and against the main body of the joint member. The load bed 149 can be generally cylindrical in shape and have a flat or concave surface to abut the terminal end of the load rod 143. As shown, the load bed 149 is cylindrical in shape, having one side with a flat surface abutting the joint member and a second side having a concave surface to receive the rounded end of the load rod 143. Most embodiments of the universal joint will include two load beds. A first load bed 149a positioned in the central cavity of the first joint member 111 and a second load bed 149b positioned in the central cavity of the second joint member 131. In this embodiment, the first load bed 149a will abut or engage the first end of the load rod 143 and the second load bed 149b will abut or engage the second end of the load rod 143.

A set rod hole 151a, 151c can be disposed through one or both joint members 111, 131 and a corresponding set rode hole 151b, 151d can be disposed through the load rod 143 at its first and/or second ends respectively. One or more set rods 145 can secure the load rod 143 to the joint members 111, 131. As shown, a first set rod 145a can be disposed through the first joint member 111 at hole 151a, in this case at about the arms 113a, 113b of the first joint member 11, and through the hole 151b disposed about the first end of the load rod 143. A second set rod 145b can be disposed through the second joint member 131 at hole 151c, shown at about arms 133a, 133b of the second joint member 131, and through the hole 151d disposed about the second end of the load rod 143. The set rod holes 151a. 15b can include a threaded portion about the outside diameter of the joint member 113, 131. The set rods 145 can be secured in place by one or more set screws 147. As shown, a first set screw 147a can be disposed in the set rod hole 151a, 151b about the first end of the set rod 154a and screw into the threaded portion thereof. A second set screw 147b can be disposed on the opposing, second end of the first set rod 145a and screw into the corresponding threaded portion of the set rod hole 151c, 1515d. A similar configuration can be accomplished for the second set rod 145b held into place by a third set screw 147c and fourth set screw 147d.

The universal joint 100 can also include a removable grease fitting (not shown). The grease fitting can be used to apply grease or other lubricant to the components of the universal joint. Several embodiments are possible, including the use of a removable grease fitting at the hole through which the set rod 145 is to be disposed. A user can attach a grease fitting at this location, insert grease into the central cavity, remove the grease fitting, and then insert and secure the set rod 145 into place. A sleeve 155 can also be used to cover certain components of the universal joint, particularly the component described herein. A grease fitting can be exceptionally useful for applying grease to the universal joint when a sleeve 155 has already been placed over the universal joint.

The joint member can extend from, or attach to, a variety of torque transfer members. FIGS. 4 and 5 depict an embodiment of a torque transfer member 400. In some circumstances, especially in mud motors used in horizontal drilling, more than one universal joint is used below the power section to remove eccentricities from the torque transfer string. The body 403 of the torque transfer member can be modified in shape and size and can be made to a predetermined length. As shown in FIG. 5, the torque transfer member 400 can include joint members at its first end 411 and second end 431 such that each end can engage corresponding joint members 471, 473 extending from other portions of the torque string.

Figure 6:
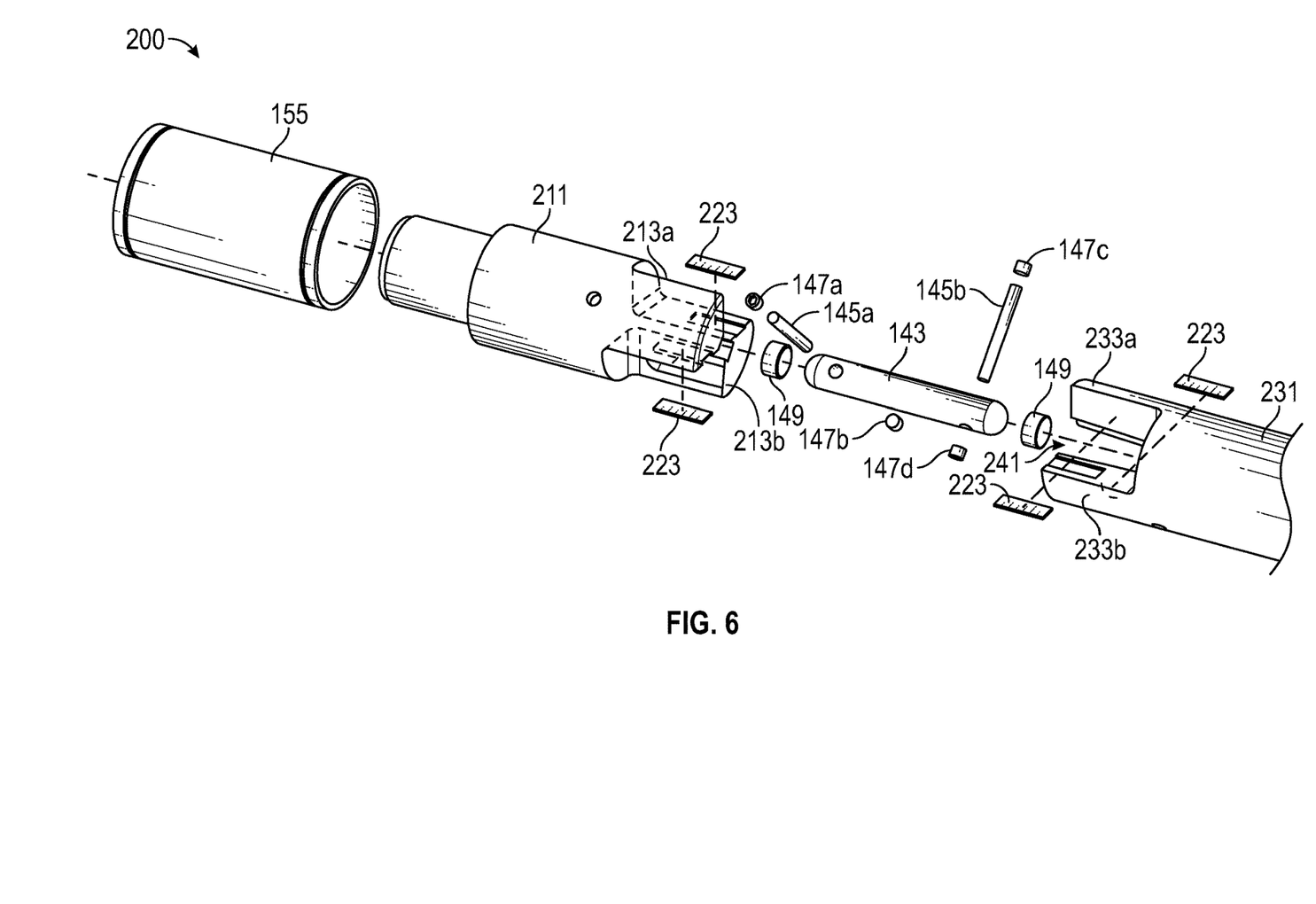
FIG. 6 depicts an exploded view of a second embodiment of a universal joint, as shown and described herein.

FIGS. 6 through 10 show a second embodiment of the universal joint disclosed herein. Different from the first embodiment presented in FIGS. 1-5, this alternative embodiment provides an alternative contact object 223 and an alternative seat and/or seating method for retaining the contact object 223 between two corresponding contact surfaces. FIG. 6 depicts an exploded view of a second embodiment of a universal joint 200. The universal joint 200 can include a first joint member 211 having two longitudinally extending arms 213a, 213b and a second joint member 231 having longitudinally extending arms 233a, 233b. One or more of the arms 213, 231 can include carve out, or bore, such that a central cavity 241 is formed when the universal joint is assembled. The universal joint 200 can include the load rod 143, set rods 145, set screws 147, set rod holes 151, or any combination thereof, that are the same as or similar to those described above in reference to FIGS. 1 through 5.

Figure 7A:
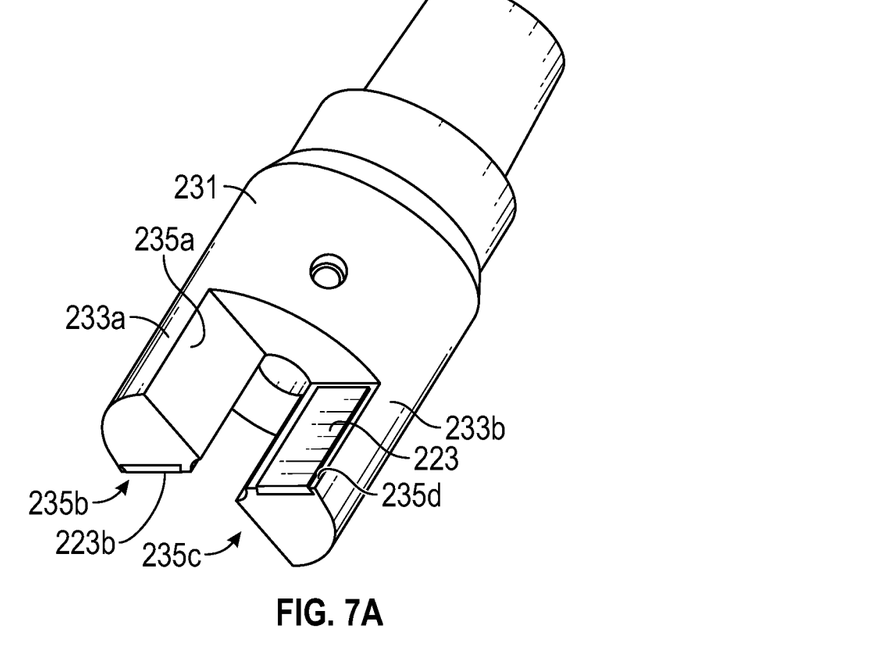
FIG. 7A depicts a first close-up view of an alternative joint member, as shown and described herein.
Figure 7B:
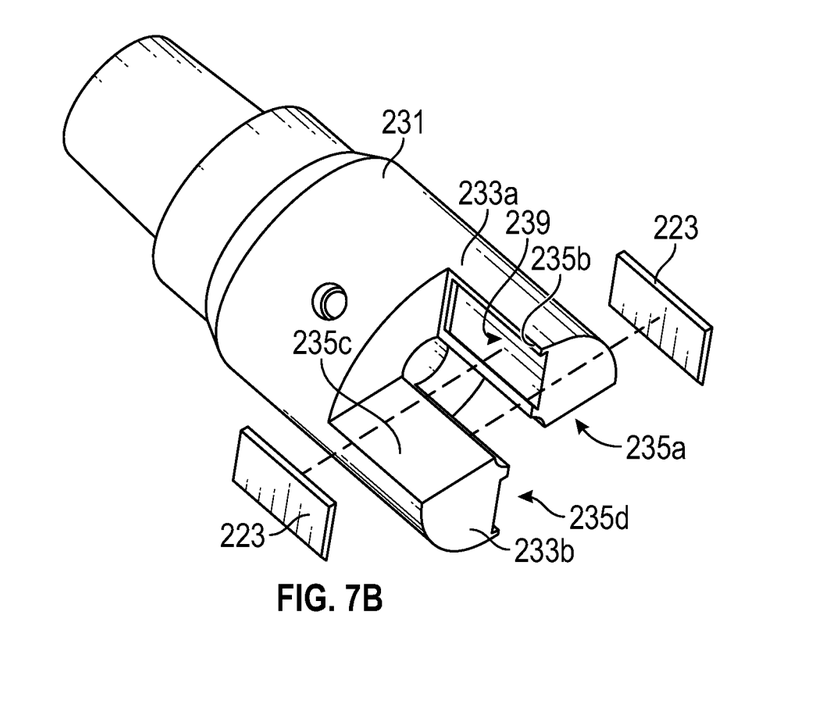
FIG. 7B depicts a second close-up view of the alternative joint member, as shown and described herein.

Each arm 213, 233 can include a contact surface and each contact surface can include one or more seats or no seat at all. In this embodiment, the contact object 223 can include a contact plate 223 which can be mounted to, welded to, disposed in or disposed on, or otherwise connected with one or more contact surfaces. FIG. 7A depicts a first close-up view of the second joint member 231 and FIG. 7B depicts a second close-up view of the second joint member 231. Some or all of the components of the first joint member 211 correspond with or mirror the second joint member 231 such that its configuration can be understood as described and shown herein.

The contact object 223 can include one or more elongated objects configured to be disposed within the seat disposed in one or more contact surfaces. As shown, the contact object 223 can be a plate, having a generally flattened body. The second joint member 231 can include one or more contact surfaces 135, one or more of which can house the contact object 223. The second joint member 231 can include the first arm 233a having a first contact surfaces 235a with a flat surface and a second contact surfaces 235b having a seat 239 for housing a contact plate 223. Similarly, the second joint member 231 can include the second arm 233b having a first contact surface 235c with a flat surface and a second contact surface 235d having a seat for housing a contact plate 223. Though not show, each contact plate can include a seat or housing to contain a contact plate 223. The contact plate 223 can be designed with a width such that all or a portion of the contact plate 223 rises above the surface of the contact surfaces which it is seated in. Depending on the forces expected to wear out the arms of the joint members, the joint members can be altered such that only contact plates disposed between corresponding contact surfaces sustain rotational force directly.

The plate 223 can be made of a variety of materials but is most often made of a hard metal or metal alloy capable of withstanding the torque under conditions in which the universal joint is operating. The plate 223 can be seated in a seat within a contact surfaces and held in place by a variety of methods. For example, the plate 223 can be fitted to slide into place such that two notches in the seat engage the edges of the plate 223. The plate can also be welded into place using a variety of welding methods. For example, the plate 223 can be tack welded into place. Once attached to the contact surface, the contact plate 223 will ear most of the rotational force during operation of the universal joint, relieving the wear on the contact surfaces.

Figure 8:
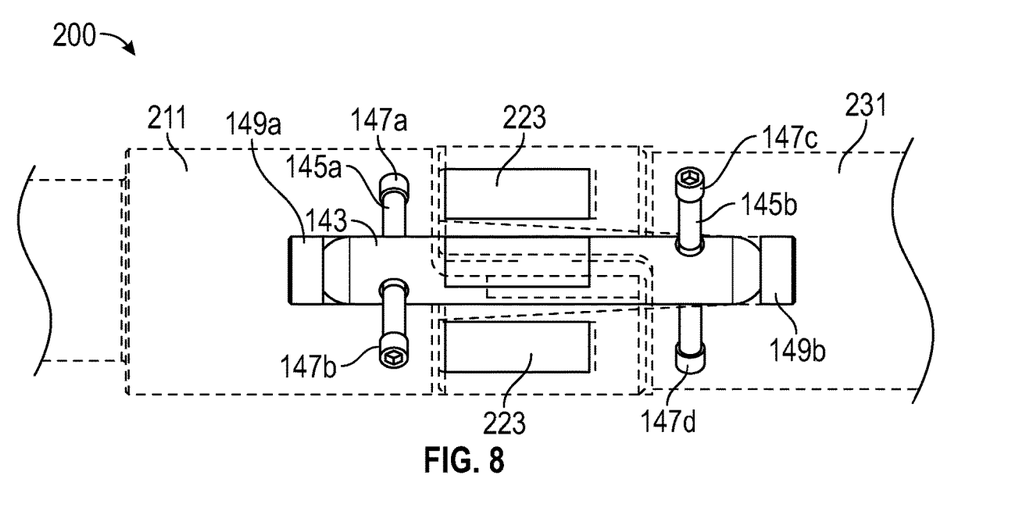
FIG. 8 depicts an x-ray view of the alternative universal joint assembly, as shown and described herein.
Figure 9:
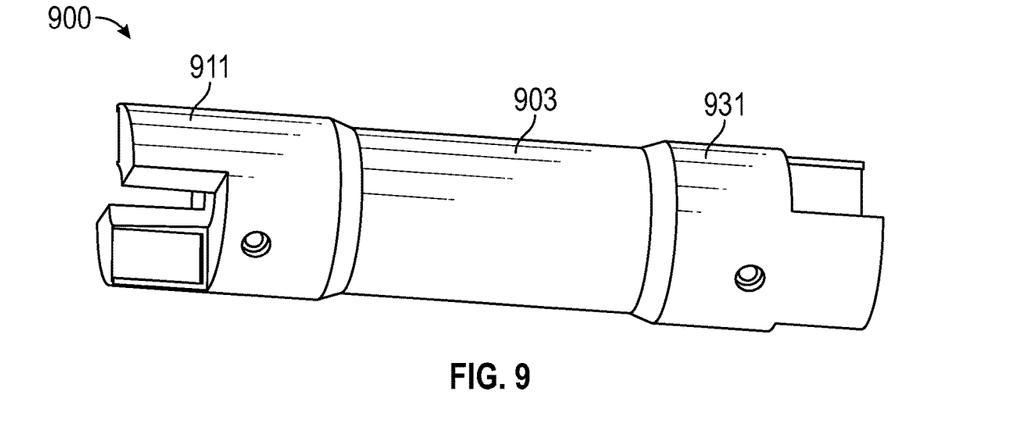
FIG. 9 depicts a torque transfer member, as shown and described herein.
Figure 10:
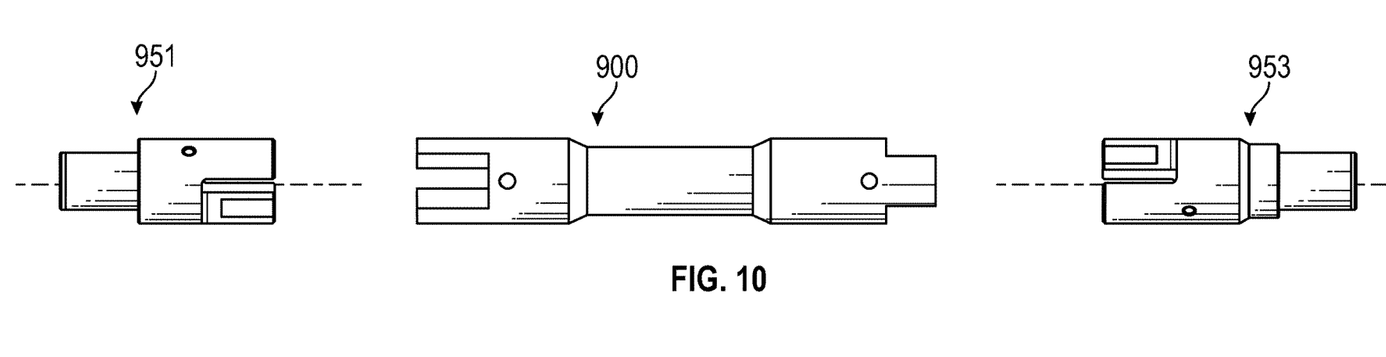
FIG. 10 depicts a torque transfer system, as shown and described herein.

FIG. 8 depicts an x-ray view of the alternative universal joint assembly. When assembled, the arms from the first joint member 211 and the arms from the second joint member 231 engage one another in an overlapping configuration. The load rod 143 is disposed in the central cavity 241 created about the central axes of the first and second joint members 211, 231. The contact plates 223 are disposed with the arms such that the contact plates 223 receive or deliver rotational force from one joint member to the other. FIG. 9 depicts a torque transfer member 900 and FIG. 10 depicts a torque transfer system 940. The torque transfer member 900 can have an elongated body 903 having a first joint member 911 about its first end and a second joint member 931 about its second end. As shown in the torque transfer system, the torque transfer member 900 having joint members 911, 931 at its first end and second end can engage corresponding joint members 951, 953 extending from other portions of the torque string.

Figure 11:
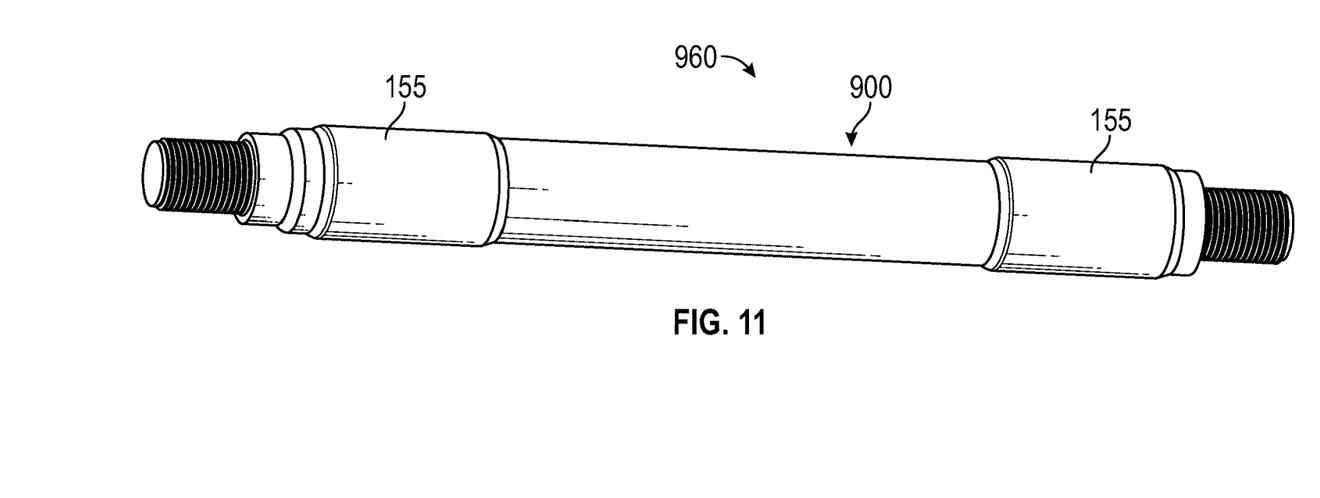
FIG. 11 depicts a torque transfer system with sleeves, as shown and described herein.

FIG. 11 depicts a torque transfer system 960 with sleeves 155 disposed over the universal joint components. Though shown with the torque transfer system depicted in FIGS. 9 and 10, a sleeve 155 can be used with any torque transfer system, including all embodiment disclosed herein. The sleeve 155 provides two primary benefits. First, the sleeve 155 prevents foreign objects (i.e., dirt, rocks, etc.) from contacting, entering, or interfering with the components of the universal joint. Such objects could potentially harm the integrity of the universal joint and weaken its performance during operation. Second, the sleeve 155 can maintain grease or other lubricants within the universal joint. Maintaining grease within the arms and central cavity of the universal joint can greatly increase the efficiency of the joint and decrease the wear on joint components.

Although the present invention has been described with respect to specific details and embodiments, it is not intended that such description be regarded as limitations on the scope of the apparatus. It will thus be appreciated that those skilled in the art will be able to devise numerous alternative arrangements that, while not shown or described herein, embody the principles of the disclosure and thus are within its spirit and scope.

We claim:

1. A universal joint comprising:
   a first joint member with longitudinally extending arms and a second joint member with longitudinally extending arms,
      wherein each arm comprises a first contact surface comprising a closed ball seat and a second contact surface comprising an open ball seat, and
      wherein the first contact surface of an aim of the first joint member opposes the second contact surface of an arm of the second joint member and the second contact surface of an arm of the first joint member opposes the first contact surface of an arm of the second joint member;
   a contact ball seated between opposing contact surfaces; and
   a load rod disposed in an axial channel between the first joint member and the second joint member.

2. The universal joint of claim 1, further comprising a first set screw securing a first end of the load rod to the first joint member and a second set screw securing a second end of the load rod to the second joint member.

3. The universal joint of claim 1, further comprising a sleeve removably disposed about the external surface of the universal joint.

4. The universal joint of claim 1, further comprising a sleeve extending from the first joint member to the second joint member such that all arms are contained therein.

5. A universal joint, comprising:
   a first joint member with longitudinally extending arms, each arm having one or more contact surfaces;
   a second joint member with longitudinally extending arms, each arm having one or more contact surfaces,
      wherein each extending arm comprises a first contact surface having an open seat and a second contact surface having a closed seat;
   an independent contact object disposed between a contact surface of the first joint member and a contact surface of the second joint member, wherein the contact object is seated between a first open seat of the first joint member and a first closed seat of the second joint member;
   a load rod disposed in an axial channel between the first joint member and the second joint member;
   a first set screw disposed through the body of the first joint member and a first end of the load rod; and
   a second set screw disposed through the body of the second joint member and a second end of the load rod, preventing longitudinal movement of the joint members in relation to one another.

\* \* \* \* \*